(12) United States Patent
Sato

(10) Patent No.: US 12,319,096 B2
(45) Date of Patent: Jun. 3, 2025

(54) TIRE

(71) Applicant: The Yokohama Rubber Co., LTD., Tokyo (JP)

(72) Inventor: Hiroaki Sato, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 710 days.

(21) Appl. No.: 17/232,826

(22) Filed: Apr. 16, 2021

(65) Prior Publication Data
US 2021/0331525 A1    Oct. 28, 2021

(30) Foreign Application Priority Data

Apr. 28, 2020  (JP) .................. 2020-079746

(51) Int. Cl.
*B60C 11/03*    (2006.01)
*B60C 11/13*    (2006.01)

(52) U.S. Cl.
CPC ... *B60C 11/0309* (2013.01); *B60C 2011/0351* (2013.01); *B60C 2011/0353* (2013.01); *B60C 2011/0355* (2013.01); *B60C 2011/0365* (2013.01); *B60C 2011/0367* (2013.01); *B60C 2011/0372* (2013.01); *B60C 2011/1338* (2013.01); *B60C 2200/06* (2013.01)

(58) Field of Classification Search
CPC . B60C 2200/06; B60C 11/0309; B60C 11/11; B60C 2011/0353; B60C 2011/0355; B60C 2011/0365; B60C 2011/0367; B60C 2011/0372; B60C 2011/0351; B60C 2011/1338
See application file for complete search history.

(56) References Cited

U.S. PATENT DOCUMENTS

| 6,293,323 B1 | 9/2001 | Binsfeld |
| 2007/0199633 A1* | 8/2007 | Hayashi ............. B60C 11/0311 |
| | | 152/DIG. 3 |

(Continued)

FOREIGN PATENT DOCUMENTS

| JP | H04138902 A * | 5/1992 | ............. B60C 11/11 |
| JP | H05-278415 A | 10/1993 | |
| JP | H06278413 A * | 10/1993 | ............. B60C 11/11 |

(Continued)

OTHER PUBLICATIONS

Yokohama, https://www.y-yokohama.com/product/or-idtire/y67_002/, Jun. 20, 2023, Tokyo.

*Primary Examiner* — Justin R Fischer
*Assistant Examiner* — Philip N Schwartz
(74) *Attorney, Agent, or Firm* — Thorpe North & Western

(57) ABSTRACT

A tire includes a plurality of main lug grooves and a plurality of sub lug grooves that extend in a tire width direction and penetrate a tread surface, and that are arranged at predetermined intervals in a tire circumferential direction. Additionally, the main lug grooves have a maximum groove width Wg1 of 15.0 mm or more and a maximum groove depth of 23.5 mm or more. In addition, the sub lug grooves have a maximum groove width Wg2 that satisfies $0.10 \leq Wg2/Wg1 \leq 0.35$ with respect to the maximum groove width Wg1 of the main lug grooves. Additionally, at least one of the sub lug grooves is disposed between adjacent ones of the main lug grooves.

12 Claims, 11 Drawing Sheets

(56) References Cited

U.S. PATENT DOCUMENTS

2014/0299242 A1* 10/2014 Chauvin ............... B60C 11/033
                                                                   152/209.8
2019/0111737 A1* 4/2019 Motomitsu ......... B60C 11/0311

FOREIGN PATENT DOCUMENTS

| JP | H0825916 A * | 1/1996 | ..... B60C 2011/0374 |
|----|---|---|---|
| JP | 2001-225612 A | 8/2001 | |
| JP | 2007083822 A * | 4/2007 | ......... B60C 11/0311 |
| JP | 2009061797 A * | 3/2009 | ............ B60C 11/04 |
| JP | 2010-173379 A | 8/2010 | |
| JP | 2013043609 A * | 3/2013 | ............ Y02T 10/86 |
| JP | 2014-521548 A | 8/2014 | |
| WO | WO 2014/170283 A1 | 10/2014 | |
| WO | WO-2017170562 A1 * | 10/2017 | ............ B60C 11/03 |

* cited by examiner

TIRE WIDTH DIRECTION

| | CONVENTIONAL EXAMPLE | EXAMPLE 1 | EXAMPLE 2 | EXAMPLE 3 | EXAMPLE 4 |
|---|---|---|---|---|---|
| PITCH NUMBER OF MAIN LUG GROOVES | 34 | 34 | 34 | 34 | 34 |
| Wg1/P1 | 0.27 | 0.27 | 0.27 | 0.39 | 0.27 |
| NUMBER OF SUB LUG GROOVES PER PITCH | - | 1 | 1 | 1 | 1 |
| Wg2/Wg1 | - | 0.30 | 0.20 | 0.13 | 0.20 |
| H2/Hg1 | - | 1.00 | 1.00 | 1.00 | 0.95 |
| NUMBER OF CIRCUMFERENTIAL GROOVES | - | - | - | - | - |
| Wg3/Wg1 | - | - | - | - | - |
| H3/Hg1 | - | - | - | - | - |
| Dg3/TW | - | - | - | - | - |
| Wg3'/Wg3 | - | - | - | - | - |
| Hg3'/Hg3 | - | - | - | - | - |
| NUMBER OF CIRCUMFERENTIAL-DIRECTION SHALLOW GROOVES IN ONE-SIDE SHOULDER REGION | - | - | - | - | - |
| W12/Wg3 | - | - | - | - | - |
| H13/Hg3 | - | - | - | - | - |
| NUMBER OF SIPES PER BLOCK | - | - | - | - | - |
| H13/H22 | - | - | - | - | - |
| SNOW TRACTION PERFORMANCE | 100 | 104 | 105 | 104 | 104 |
| UNEVEN WEAR RESISTANCE PERFORMANCE | 100 | 100 | 100 | 100 | 100 |

FIG. 8

|  | EXAMPLE 5 | EXAMPLE 6 | EXAMPLE 7 | EXAMPLE 8 | EXAMPLE 9 | EXAMPLE 10 |
|---|---|---|---|---|---|---|
| PITCH NUMBER OF MAIN LUG GROOVES | 34 | 34 | 34 | 34 | 34 | 34 |
| Wg1/P1 | 0.27 | 0.27 | 0.27 | 0.27 | 0.27 | 0.27 |
| NUMBER OF SUB LUG GROOVES PER PITCH | 1 | 2 | 1 | 1 | 1 | 1 |
| Wg2/Wg1 | 0.20 | 0.20 | 0.20 | 0.20 | 0.20 | 0.20 |
| H2/Hg1 | 0.80 | 1.00 | 1.00 | 1.00 | 1.00 | 1.00 |
| NUMBER OF CIRCUMFERENTIAL GROOVES | - | - | 4 | 4 | 4 | 4 |
| Wg3/Wg1 | - | - | 0.28 | 0.33 | 0.38 | 0.48 |
| H3/Hg1 | - | - | 1.00 | 1.00 | 1.00 | 1.00 |
| Dg3/TW | - | - | 0.25 | 0.25 | 0.25 | 0.25 |
| Wg3'/Wg3 | - | - | 1.00 | 1.00 | 1.00 | 1.00 |
| Hg3'/Hg3 | - | - | 1.00 | 1.00 | 1.00 | 1.00 |
| NUMBER OF CIRCUMFERENTIAL-DIRECTION SHALLOW GROOVES IN ONE-SIDE SHOULDER REGION | - | - | - | - | - | - |
| W12/Wg3 | - | - | - | - | - | - |
| H13/Hg3 | - | - | - | - | - | - |
| NUMBER OF SIPES PER BLOCK | - | - | - | - | - | - |
| H13/H22 | - | - | - | - | - | - |
| SNOW TRACTION PERFORMANCE | 103 | 110 | 115 | 120 | 122 | 124 |
| UNEVEN WEAR RESISTANCE PERFORMANCE | 100 | 99 | 99 | 99 | 99 | 99 |

| | EXAMPLE 11 | EXAMPLE 12 | EXAMPLE 13 | EXAMPLE 14 | EXAMPLE 15 | EXAMPLE 16 | EXAMPLE 17 |
|---|---|---|---|---|---|---|---|
| PITCH NUMBER OF MAIN LUG GROOVES | 34 | 34 | 34 | 34 | 34 | 34 | 34 |
| Wg1/P1 | 0.27 | 0.27 | 0.27 | 0.27 | 0.27 | 0.27 | 0.27 |
| NUMBER OF SUB LUG GROOVES PER PITCH | 1 | 1 | 1 | 1 | 1 | 1 | 1 |
| Wg2/Wg1 | 0.20 | 0.20 | 0.20 | 0.20 | 0.20 | 0.20 | 0.20 |
| H2/Hg1 | 1.00 | 1.00 | 1.00 | 1.00 | 1.00 | 1.00 | 1.00 |
| NUMBER OF CIRCUMFERENTIAL GROOVES | 4 | 4 | 4 | 4 | 4 | 4 | 4 |
| Wg3/Wg1 | 0.33 | 0.33 | 0.33 | 0.33 | 0.33 | 0.33 | 0.33 |
| H3/Hg1 | 0.88 | 0.70 | 0.70 | 0.70 | 0.70 | 0.70 | 0.70 |
| Dg3/TW | 0.25 | 0.25 | 0.25 | 0.25 | 0.25 | 0.25 | 0.25 |
| Wg3'/Wg3 | 1.00 | 1.00 | 0.90 | 0.80 | 0.80 | 0.80 | 0.80 |
| Hg3'/Hg3 | 1.00 | 1.00 | 1.00 | 1.00 | 0.85 | 0.95 | 1.00 |
| NUMBER OF CIRCUMFERENTIAL-DIRECTION SHALLOW GROOVES IN ONE-SIDE SHOULDER REGION | - | - | - | - | - | - | 1 |
| W12/Wg3 | - | - | - | - | - | - | 0.90 |
| H13/Hg3 | - | - | - | - | - | - | 0.95 |
| NUMBER OF SIPES PER BLOCK | - | - | - | - | - | - | - |
| H13/H22 | - | - | - | - | - | - | - |
| SNOW TRACTION PERFORMANCE | 118 | 116 | 115 | 114 | 112 | 110 | 125 |
| UNEVEN WEAR RESISTANCE PERFORMANCE | 99 | 99 | 99 | 99 | 99 | 99 | 98 |

|  | EXAMPLE 18 | EXAMPLE 19 | EXAMPLE 20 | EXAMPLE 21 | EXAMPLE 22 | EXAMPLE 23 |
|---|---|---|---|---|---|---|
| PITCH NUMBER OF MAIN LUG GROOVES | 34 | 34 | 34 | 34 | 34 | 34 |
| Wg1/P1 | 0.27 | 0.27 | 0.27 | 0.27 | 0.27 | 0.27 |
| NUMBER OF SUB LUG GROOVES PER PITCH | 1 | 1 | 1 | 1 | 1 | 1 |
| Wg2/Wg1 | 0.20 | 0.20 | 0.20 | 0.20 | 0.20 | 0.20 |
| H2/Hg1 | 1.00 | 1.00 | 1.00 | 1.00 | 1.00 | 1.00 |
| NUMBER OF CIRCUMFERENTIAL GROOVES | 4 | 4 | 4 | 4 | 4 | 4 |
| Wg3/Wg1 | 0.33 | 0.33 | 0.33 | 0.33 | 0.33 | 0.33 |
| H3/Hg1 | 0.70 | 0.70 | 0.70 | 0.70 | 0.70 | 0.70 |
| Dg3/TW | 0.25 | 0.25 | 0.25 | 0.25 | 0.25 | 0.25 |
| Wg3'/Wg3 | 0.80 | 0.80 | 0.80 | 0.80 | 0.80 | 0.80 |
| Hg3'/Hg3 | 1.00 | 1.00 | 1.00 | 1.00 | 1.00 | 1.00 |
| NUMBER OF CIRCUMFERENTIAL-DIRECTION SHALLOW GROOVES IN ONE-SIDE SHOULDER REGION | 1 | 1 | 1 | 1 | 1 | 1 |
| W12/Wg3 | 0.75 | 0.50 | 0.50 | 0.50 | 0.50 | 0.50 |
| H13/Hg3 | 0.95 | 0.95 | 0.70 | 0.50 | 0.50 | 0.50 |
| NUMBER OF SIPES PER BLOCK | - | - | - | - | 1 | 1 |
| H13/H22 | - | - | - | - | 0.70 | 0.85 |
| SNOW TRACTION PERFORMANCE | 123 | 121 | 120 | 119 | 130 | 135 |
| UNEVEN WEAR RESISTANCE PERFORMANCE | 98 | 98 | 98 | 98 | 96 | 96 |

FIG. 11

TIRE

CROSS-REFERENCE TO RELATED APPLICATIONS

This application claims priority pursuant to 35 U.S.C. 119(a) of Japan Patent Application No. 2020-079746, filed Apr. 28, 2020, which application is incorporated herein by reference in its entirety.

TECHNICAL FIELD

The present technology relates to a tire and particularly relates to a tire that can have improved snow traction performance while maintaining the uneven wear resistance performance of the tire.

BACKGROUND ART

Pneumatic tires for construction vehicles mounted on snow removing motor graders have a configuration in which wide land portions extending in the tire width direction are provided on a tread surface in order to enhance the cut resistance performance and wear resistance performance of the tire. The technology described in Construction Vehicle and Industrial Vehicle Tire Site Top>Y-582H/Y-67 (accessed at https://www.y-yokohama.com/product/or-idtire/y67_002/ on Apr. 24, 2013) is a known conventional construction vehicle tire employing the above-described configuration.

SUMMARY

The technology provides a tire that can have improved snow traction performance while maintaining the uneven wear resistance performance of the tire.

A tire according to an embodiment of the technology includes a plurality of main lug grooves and a plurality of sub lug grooves that extend in a tire width direction and penetrate a tread surface, and that are arranged at predetermined intervals in a tire circumferential direction, the main lug grooves being defined as lug grooves having a maximum groove width $Wg1$ of 15.0 mm or more and a maximum groove depth $Hg1$ of 23.5 mm or more, the sub lug grooves being defined as lug grooves having a maximum groove width $Wg2$ that satisfies a condition of $0.10 \leq Wg2/Wg1 \leq 0.35$ with respect to the maximum groove width $Wg1$ of the main lug grooves, and at least one of the sub lug grooves being disposed between adjacent ones of the main lug grooves.

According to an embodiment of the technology, (1) since the tire includes wide main lug grooves, there is an advantage in that the snow discharge properties exhibited when traveling on a snowy road surface are improved and the snow traction properties of the tire are improved compared with a configuration in which only narrow lug grooves are arranged in the tire circumferential direction. Additionally, (2) since the tire includes narrow sub lug grooves each disposed between adjacent ones of the main lug grooves, there is an advantage in that the number of edge components of land portions is increased and the traction characteristics of the tire are improved compared with a configuration in which only the main lug grooves are provided. In addition, there is an advantage in that (3) the maximum groove width $Wg2$ of the sub lug grooves is appropriately set with respect to the maximum groove width $Wg1$ of the main lug groove 21. In other words, the lower limit of the above-described ratio $WG2/Wg1$ ensures the snow discharge properties of the sub lug grooves, and the upper limit of the above-described ratio $Wg2/Wg1$ suppresses a decrease in the rigidity of the land portions caused by an excessively large groove width of the sub lug grooves.

BRIEF DESCRIPTION OF DRAWINGS

FIGS. 8-11 are tables showing the results of performance tests of tires according to embodiments of the technology.

DETAILED DESCRIPTION

Embodiments of the technology are described in detail below with reference to the drawings. However, the technology is not limited to these embodiments. Moreover, constituents of the embodiments include elements that are substitutable while maintaining consistency with the technology, and obviously substitutable elements. Furthermore, the modified examples described in the embodiments can be combined as desired within the scope apparent to one skilled in the art.

Tire

Figure 1:
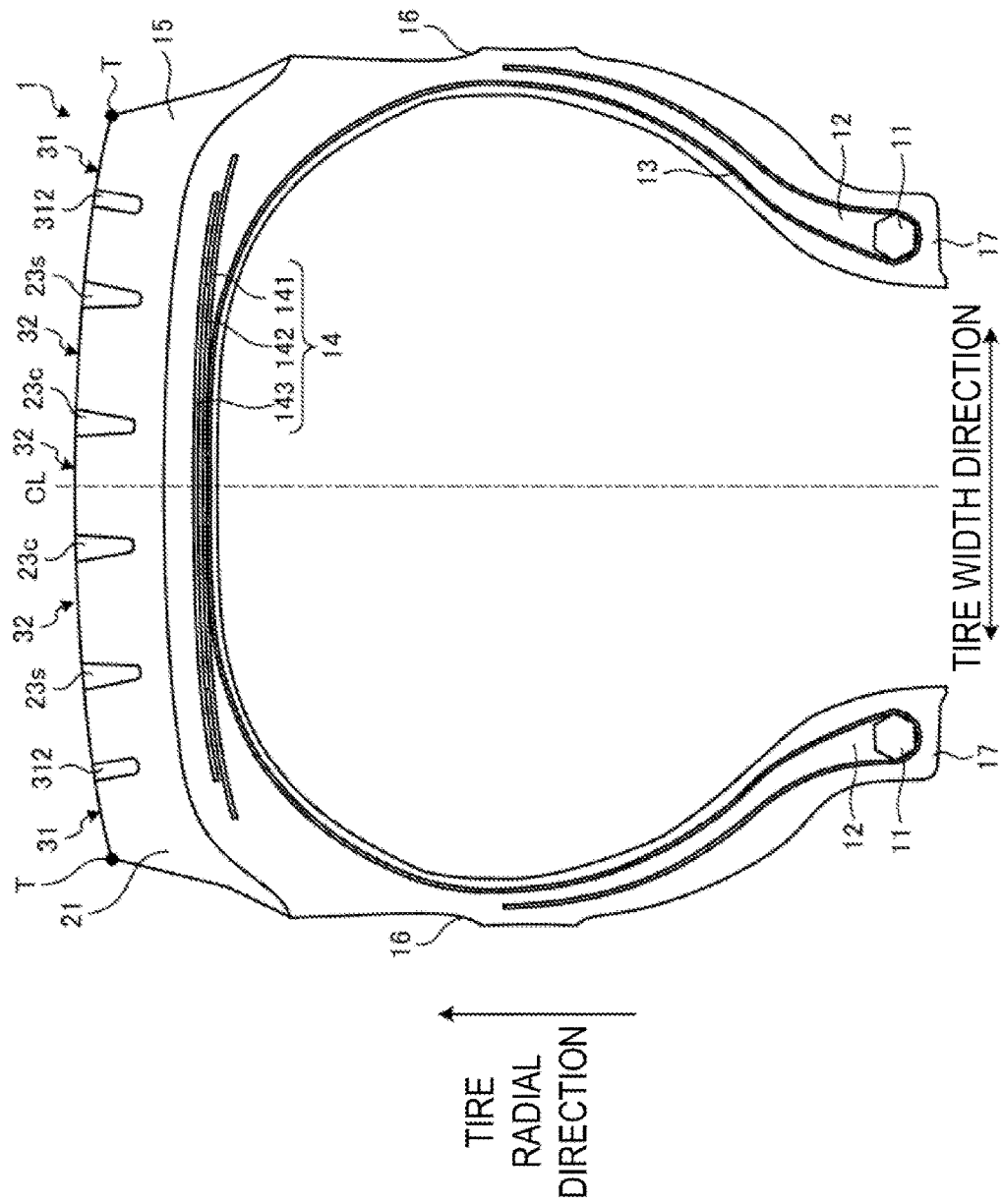
FIG. 1 is a cross-sectional view in a tire meridian direction illustrating a tire according to an embodiment of the technology.

FIG. 1 is a cross-sectional view in a tire meridian direction illustrating a tire according to an embodiment of the technology. The same drawing illustrates a cross-sectional view of a half region in a tire radial direction. In this embodiment, a pneumatic tire for a construction vehicle referred to as an off road tire (OR tire) is illustrated as an example of the tire.

In the same drawing, a cross section in the tire meridian direction is defined as a cross section of the tire taken along a plane that includes a tire rotation axis (not illustrated). Additionally, a tire equatorial plane CL is defined as a plane that is perpendicular to the tire rotation axis and that extends through a midpoint between measurement points of a tire cross-sectional width defined by JATMA (The Japan Automobile Tyre Manufacturers Association, Inc.). Additionally, a tire width direction refers to a direction parallel with the tire rotation axis. The tire radial direction refers to a direction perpendicular to the tire rotation axis. In addition, point T denotes a tire ground contact edge.

A tire 1 has an annular structure with a tire rotation axis as its center and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 include one or a plurality of bead wires made of steel and wound multiple times in an annular shape, and are embedded in bead portions to form cores of left and right bead portions. The pair of bead fillers 12, 12 are respectively disposed on a periphery of the pair of bead cores 11, 11 in the tire radial direction and reinforce the bead portions.

The carcass layer 13 has a single layer structure made of one carcass ply or a multilayer structure made by layering a plurality of carcass plies and extends between the left and right bead cores 11, 11 in a toroidal shape, forming the framework of the tire. Additionally, both end portions of the carcass layer 13 are turned back toward an outer side in the tire width direction so as to wrap around the bead cores 11 and the bead fillers 12 and are fixed. Additionally, the carcass ply of the carcass layer 13 is formed by covering a plurality of carcass cords made from steel with a rubber coating and performing a rolling process thereon. The carcass ply of the carcass layer 13 has a cord angle (defined as the inclination angle in the longitudinal direction of the carcass cords with respect to the tire circumferential direction) of 80° or more and 110° or less for radial tires and 30° or more and 45° or less for bias tires as absolute values. Additionally, the cord diameter of the carcass cord is within a range of 1.5 mm or more and 2.5 mm or less.

The belt layer 14 is a multilayer structure including a plurality of belt plies 141 to 143 and is disposed around the periphery of the carcass layer 13. In particular, in an OR tire, three to eight belt plies (three in FIG. 1) are layered to form the belt layer 14. Furthermore, the belt plies 141 to 143 are formed by covering steel cords with a rubber coating and performing a rolling process thereon. Additionally, the belt plies 141 to 143 have cord angles (defined as the inclination angle in the longitudinal direction of the belt cords with respect to the tire circumferential direction) of opposite signs with respect to adjacent belt plies, and are layered such that the inclination directions of the belt cords are alternately reversed. Thus, a cross-ply structure is formed to increase the structural strength of the belt layer 14. Additionally, the outer diameter of the belt cord is within a range of 1.5 mm or more and 2.5 mm or less.

The tread rubber 15 is disposed on an outer periphery in the tire radial direction of the carcass layer 13 and the belt layer 14 and constitutes a tread portion of the tire 1. The pair of sidewall rubbers 16, 16 are disposed on the outer side in the tire width direction of the carcass layer 13 and constitute left and right sidewall portions. The pair of rim cushion rubbers 17, 17 extend from an inner side in the tire radial direction of the left and right bead cores 11, 11 and turned back portions of the carcass layer 13 in an outer side in the tire width direction and constitute rim fitting surfaces of the bead portions.

Tread Surface

Figure 2:
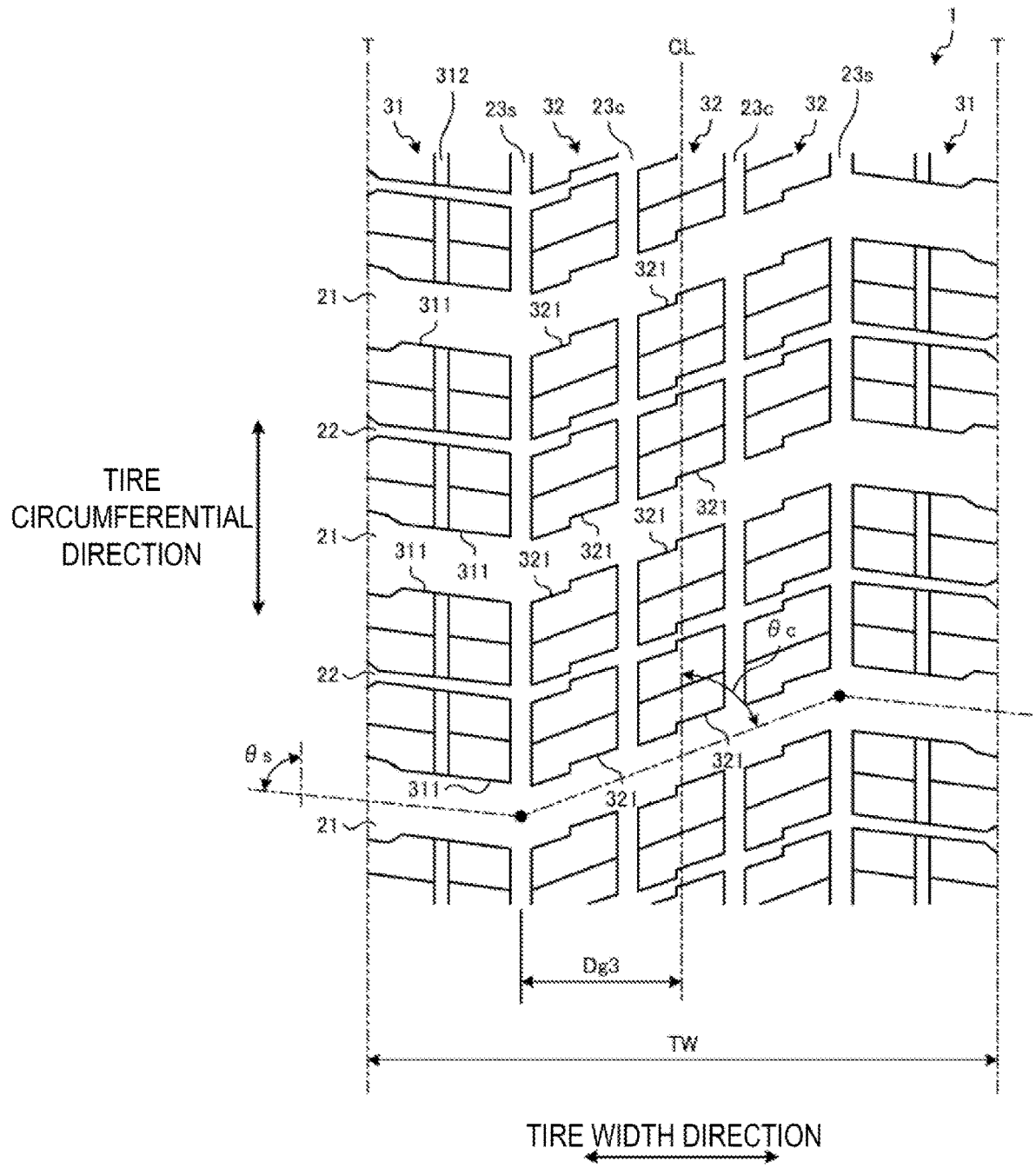
FIG. 2 is a plan view illustrating a tread surface of the tire illustrated in FIG. 1.
Figure 3:
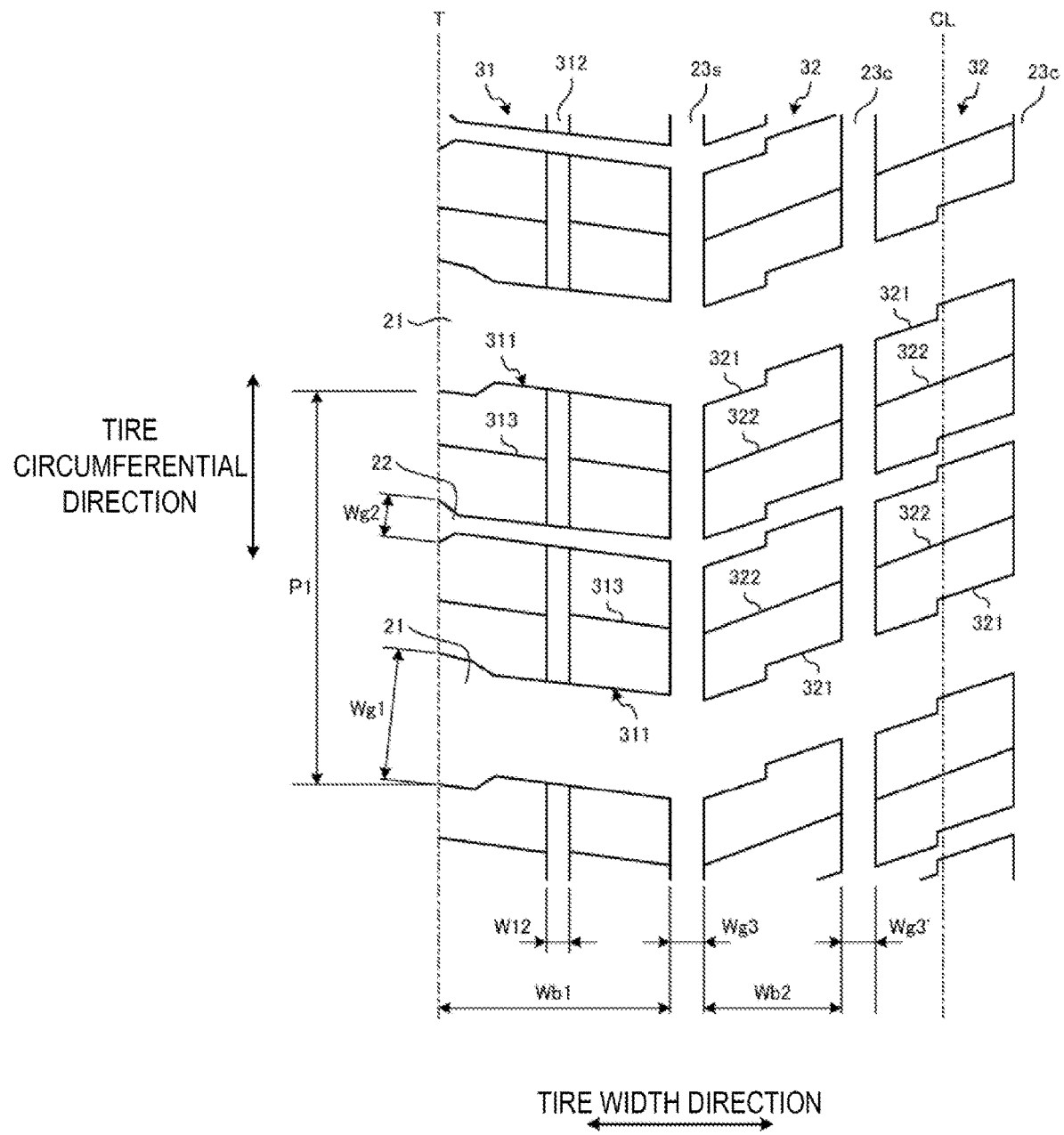
FIG. 3 is an enlarged view illustrating a tread surface illustrated in FIG. 2.
Figure 4:
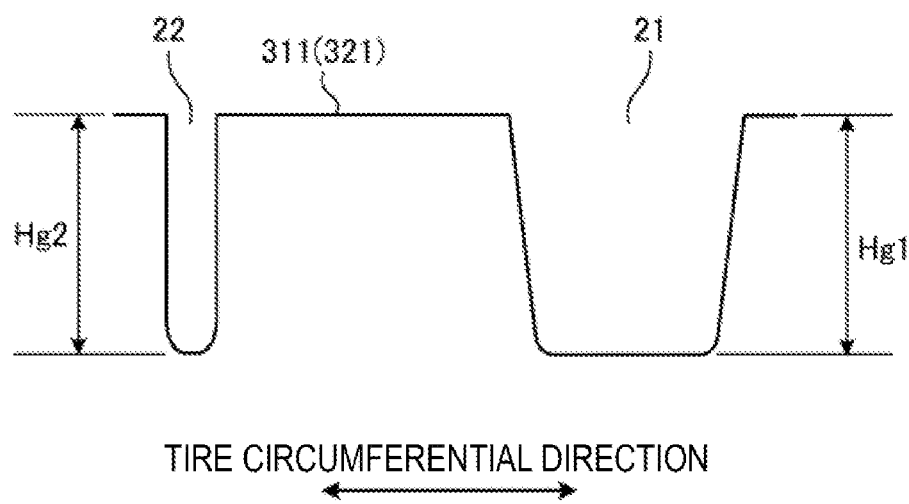
FIG. 4 is a circumferential cross-sectional view of the tire illustrated in FIG. 2.
Figure 5:
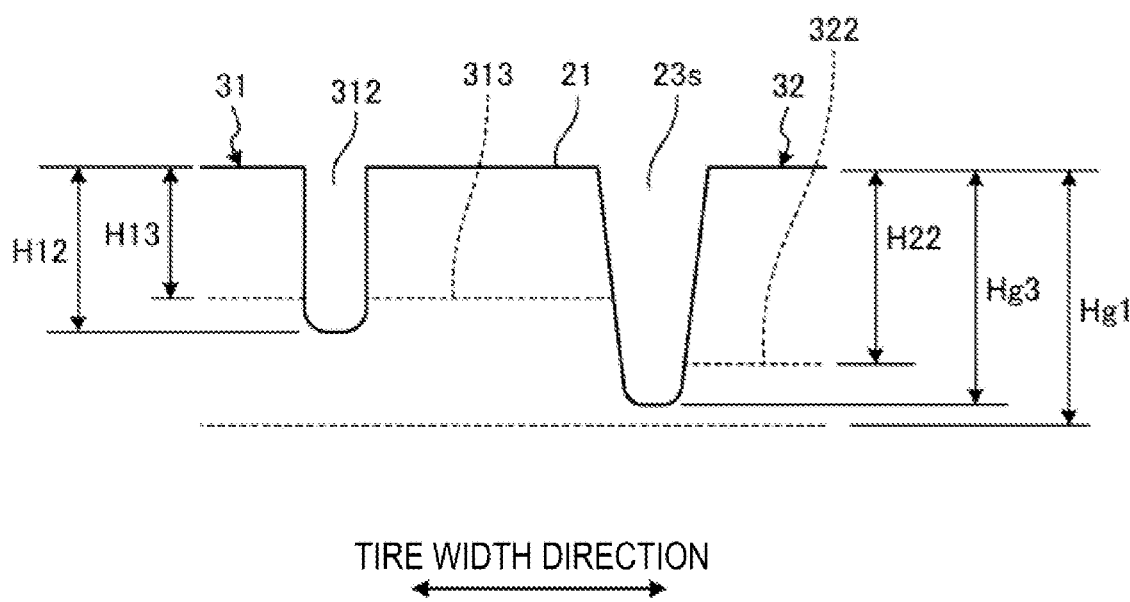
FIG. 5 is a width-direction cross-sectional view of the tire illustrated in FIG. 2.

FIG. 2 is a plan view illustrating a tread surface of the tire 1 illustrated in FIG. 1. The same drawing illustrates a tread surface of a snow removing motor grader tire. FIG. 3 is an enlarged view illustrating one side region of the tread surface illustrated in FIG. 2. FIG. 4 and FIG. 5 are a circumferential cross-sectional view (FIG. 4) of the tire 1 illustrated in FIG. 2 and a width-direction cross sectional view (FIG. 5) of the tire 1 illustrated in FIG. 2. In the drawings, "tire circumferential direction" refers to a direction around the tire rotation axis. Reference sign T denotes a tire ground contact edge, and a dimension symbol TW denotes a tire ground contact width.

As illustrated in FIG. 2, the tire 1 includes a plurality of main lug grooves 21 and a plurality of sub lug grooves 22, three or more circumferential grooves 23s, 23c, and four or more rows of land portions 31, 32.

As illustrated in FIG. 2, the main lug grooves 21 are lug grooves extending in the tire width direction and penetrating the tread surface. Each of the main lug grooves 21 is defined as a lug groove having a maximum groove width Wg1 (see FIG. 3) of 15.0 mm or more and a maximum groove depth Hg1 (see FIG. 4) of 23.5 mm or more. In the configuration in FIG. 2, the main lug groove is a main groove on which a wear indicator must be provided as specified by JATMA, and has the greatest groove depth among the grooves formed in the tread surface. Additionally, the plurality of the main lug grooves 21 are arranged at a predetermined pitch in the tire circumferential direction. Additionally, the maximum groove width Wg1 of the main lug groove 21 has a relationship $0.15 \leq Wg1/P1 \leq 0.40$, and preferably a relationship $0.20 \leq Wg1/P1 \leq 0.30$, with respect to the pitch length P1 of the main lug grooves.

The groove width is measured as a distance between opposing groove walls at a groove opening portion when the tire is mounted on a specified rim, inflated to a specified internal pressure, and in an unloaded state. In a configuration in which the groove opening portion includes a notch portion or a chamfered portion, the groove width is measured with intersection points between an extension line of the tread contact surface and extension lines of the groove walls as measurement points, in a cross-sectional view parallel with the groove width direction and the groove depth direction.

The groove depth is the distance from the tread contact surface to the groove bottom and is measured when the tire is mounted on a specified rim, inflated to a specified internal pressure, and in an unloaded state. Additionally, in a configuration in which the grooves include a partial recess/protrusion portion or sipes on the groove bottom, the groove depth is measured excluding these portions.

"Specified rim" refers to a "standard rim" defined by JATMA, a "design rim" defined by TRA (The Tire and Rim Association, Inc.), or a "measuring rim" defined by ETRTO (The European Tyre and Rim Technical Organisation). Additionally, "specified internal pressure" refers to a "maximum air pressure" defined by JATMA, to the maximum value in "tire load limits at various cold inflation pressures" defined by TRA, or to "inflation pressures" defined by ETRTO. Additionally, "specified load" refers to a "maximum load capacity" defined by JATMA, the maximum value in "tire load limits at various cold inflation pressures" defined by TRA, or "load capacity" defined by ETRTO.

As illustrated in FIG. 2, the sub lug grooves 22 are lug grooves extending in the tire width direction and penetrating the tread surface. Each of the sub lug grooves 22 is defined as a lug groove having a relationship $0.10 \leq Wg2/Wg1 \leq 0.35$, and preferably a relationship $0.12 \leq Wg2/Wg1 \leq 0.30$, with respect to the maximum groove width Wg1 of the main lug groove 21. Accordingly, the sub lug grooves 22 have a maximum groove width Wg2 (see FIG. 3) of 5.0 mm or more. The maximum groove depth Hg2 of the sub lug groove 22 has a relationship $0.80 \leq Hg2/Hg1 \leq 1.00$, and preferably a relationship $0.90 \leq Hg2/Hg1 \leq 1.00$, with respect to the maximum groove depth Hg1 of the main lug groove 21. Additionally, at least one sub lug groove 22 (single lug groove in FIG. 2) is disposed between adjacent ones of the main lug grooves 21, 21.

In the configuration described above, (1) since the tire 1 includes the main lug grooves 21, which are wide, the configuration described above improves snow discharge properties exhibited when traveling on a snowy road surface and thus improves snow traction properties of the tire compared with a configuration in which only the narrow lug grooves are arranged in the tire circumferential direction. Additionally, (2) because the configuration includes the narrow sub lug grooves 22 each disposed between adjacent ones of the main lug grooves 21, 21, the number of edge components of the land portion is increased and the traction characteristics of the tire are improved compared with a configuration (not illustrated) in which only the main lug grooves are provided, and the arrangement interval of the main lug grooves 21 is increased to enable the rigidity of the land portions to be increased. Additionally, (3) the sub lug groove 22 is appropriately set with respect to the maximum groove width Wg1 of the maximum groove width Wg2 main lug groove 21. Specifically, the lower limit of the above-described ratio WG2/Wg1 ensures the snow discharge properties of the sub lug grooves 22, and the upper limit of the above-described ratio Wg2/Wg1 suppresses a decrease in the rigidity of the land portions caused by an excessively large groove width of the sub lug groove 22.

For example, in the configuration in FIG. 2, the main lug grooves 21 and the sub lug grooves 22 are alternately arranged in the tire circumferential direction. Additionally, the groove center lines of each of the main lug grooves 21 and each of the sub lug grooves 22 are mutually parallel, and have a zigzag shape with two bend points (reference sign is omitted in the drawings) as a whole. Additionally, the bend points of each groove center line are within a pair of shoulder circumferential grooves 23s, 23s, which will be described below.

The groove center lines of the lug grooves are defined as imaginary lines obtained by approximating, with straight lines, the center lines of the grooves in the shoulder region and the center region of the tread portion, and connecting the straight lines. The center line of each groove portion is defined as an imaginary line connecting midpoints between measurement points of the groove width.

The shoulder region and the center region of the tread portion are defined as a tire ground contact edge T-side region and a tire equatorial plane-side region defined by the pair of shoulder circumferential grooves 23s, 23s described below.

Additionally, in FIG. 2, the inclination angles θs, θc of the main lug grooves 21 with respect to the tire circumferential direction in the shoulder region and the center region of the tread portion are in the ranges of 80 degrees≤θs≤100 degrees and 60 degrees≤θc≤75 degrees. Additionally, in the configuration in FIG. 2, the groove portion of the main lug groove 21 in the shoulder region and the groove portion of the main lug groove 21 in the center region are inclined in mutually opposite directions with respect to the tire circumferential direction. Such a configuration is preferable in that the configuration improves the snow discharge properties of the main lug grooves 21 exhibited when traveling on a snowy road surface. However, no such limitation is intended, and the groove portion of the main lug groove 21 in the shoulder region and the groove portion of the main lug groove 21 in the center region may be inclined in the same direction with respect to the tire circumferential direction (not illustrated).

The inclination angles θs, θc of the main lug grooves 21 are each measured as an angle between the groove center line of the main lug groove 21 as described above and the tire circumferential direction.

Additionally, as illustrated in FIG. 3, the main lug grooves 21 and the sub lug grooves 22 include a partial widened portion (reference sign is omitted in the drawings) at the opening portion with respect to the tire ground contact edge T. Specifically, the main lug grooves 21 and the sub lug grooves 22 have widened portions in a region closer to the tire ground contact edge T than a circumferential-direction shallow groove 312 described below, and respectively have the maximum groove widths Wg1, Wg2 at the widened portions. Additionally, the ratio of each of the maximum groove widths Wg1, Wg2 of the main lug grooves 21 and the sub lug grooves 22 in the shoulder region of the tread portion to the minimum groove width (dimension symbol omitted in the drawings) is in a range of 1.00 or more and 1.25 or less. Thus, with the rigidity of shoulder blocks 311 described below ensured, the snow discharge properties of the main lug grooves 21 and the sub lug grooves 22 are improved.

Note that in the configuration in FIG. 2, the tire 1 includes no third lug grooves having a groove width intermediate between the groove widths of the main lug groove 21 and the sub lug groove 22. Specifically, the tire 1 includes no third lug grooves having a maximum groove width smaller than the lower limit (15.0 mm) of the maximum groove width Wg1 of the main lug groove 21, and greater than the upper limit (Wg2/Wg1≤0.35, i.e., 17.5 mm) of the maximum groove width Wg2 of the sub lug groove 22.

On the other hand, the tire 1 may include lug grooves or sipes that are narrower than the sub lug grooves 22, and specifically, third lug grooves or sipes having a maximum groove width smaller than the lower limit (5.0 mm) of the maximum groove width Wg2 of the sub lug groove 22. For example, in the configuration in FIG. 2, the tire 1 includes sipes 313, 322 (see FIG. 3) between the main lug groove 21 and the sub lug groove 22. These sipes 313 and 322 will be described below.

As illustrated in FIG. 2, the circumferential grooves 23s, 23c are defined as circumferential grooves extending continuously in the tire circumferential direction and respectively having maximum groove widths Wg3, Wg3' (see FIG. 3) of 10.5 mm or more and maximum groove depths Hg3 (see FIG. 5), Hg3' (not illustrated) that are 70% or more of the maximum groove depth Hg1 of the main lug groove 21. Additionally, among the three or more circumferential grooves 23s, 23c, the pair of circumferential grooves 23s, 23s disposed on the outermost side in the tire width direction are defined as shoulder circumferential grooves, and the one or more of the circumferential grooves 23c disposed between the shoulder circumferential grooves 23s, 23s are defined as the center circumferential grooves. Additionally, a distance Dg3 from the tire equatorial plane CL to the groove center line of each of the pair of shoulder circumferential grooves 23s, 23s has a relationship 0.20≤Dg3/TW≤0.35 with respect to the tire ground contact width TW. Note that the circumferential-direction shallow grooves 312 described below do not correspond to circumferential grooves because the circumferential-direction shallow grooves 312 do not satisfy the condition for the groove depth of the circumferential-direction shallow grooves 23s, 23c described above.

The tire ground contact width TW is measured as the maximum linear distance in the tire axial direction of a contact surface between the tire and a flat plate when the tire is mounted on a specified rim, inflated to a specified internal pressure, placed perpendicular to the flat plate in a static state, and loaded with a load corresponding to a specified load.

The tire ground contact edge T is defined as a maximum width position in the tire axial direction of the contact surface between the tire and a flat plate when the tire is mounted on a specified rim, inflated to a specified internal pressure, placed perpendicular to the flat plate in a static state, and loaded with a load corresponding to a specified load.

In the configuration described above, the circumferential grooves 23s, 23c extend in the tire circumferential direction and intersect with the main lug grooves 21 and the sub lug grooves 22, thus promoting snow discharge from the main lug grooves 21 and the sub lug grooves 22. Thus, the traction characteristics of the tire are improved.

In FIG. 3, a maximum groove width Wg3 of the pair of shoulder circumferential grooves 23s has a relationship $0.25 \leq Wg3/Wg1 \leq 0.67$, and preferably a relationship $0.30 \leq Wg3/Wg1 \leq 0.55$, with respect to the maximum groove width Wg1 of the main lug groove 21. The maximum groove width Wg3' of the center circumferential groove 23c has a relationship $0.80 \leq Wg3'/Wg3 \leq 1.00$, and preferably a relationship $0.90 \leq Wg3'/Wg3 \leq 1.00$, with respect to the maximum groove width Wg3 of the shoulder circumferential groove 23s.

Additionally, the maximum groove depth Hg3 of the pair of shoulder circumferential grooves 23s, 23s (see FIG. 5) has a relationship $0.70 \leq Hg3/Hg1 \leq 0.90$ with respect to the maximum groove depth Hg1 of the main lug groove 21. Additionally, the maximum groove depth Hg3' of the center circumferential groove 23c (not illustrated) has a relationship $0.85 \leq Hg3'/Hg3 \leq 1.00$, and preferably a relationship $0.95 \leq Hg3'/Hg3 \leq 1.00$, with respect to the maximum groove depth Hg3 of the pair of shoulder circumferential grooves 23s.

Four or more rows of land portions 31, 32 are classified into a pair of shoulder land portions 31, 31 and two or more rows of center land portions 32. The shoulder land portion 31 is defined as a land portion defined by the tire ground contact edge T and the shoulder circumferential groove 23s. The center land portion 32 is defined as a land portion defined by the shoulder circumferential groove 23s and the center circumferential groove 23c adjacent thereto or adjacent ones of the center circumferential grooves 23c, 23c.

For example, in the configuration in FIG. 2, a pair of shoulder land portions 31, 31, and three rows of center land portions 32 are defined by a pair of shoulder circumferential grooves 23s, 23s and two center circumferential grooves 23c, 23c. Additionally, all of the circumferential grooves 23s, 23c have a straight shape. In addition, one row of center land portions 32 is disposed on the tire equatorial plane CL. Additionally, in the center region of the tread portion, no third circumferential grooves having a maximum groove width of 12.5 mm or more are disposed, and no third circumferential narrow grooves or sipes having a maximum groove width of less than 12.5 mm are disposed. Thus, the shoulder land portion 31 and the center land portion 32 have a continuous road contact surface in the tire width direction.

Additionally, in FIG. 3, a maximum ground contact width Wb1 of the shoulder land portion 31 in the tire width direction has a relationship $0.19 \leq Wb1/TW \leq 0.30$ with respect to the tire ground contact width TW. In addition, a maximum ground contact width Wb2 of the center land portion 32 in the tire width direction is in a range of $0.13 \leq Wb2/TW \leq 0.19$, and preferably in a range of $0.15 \leq Wb2/TW \leq 0.16$, with respect to the tire ground contact width TW. The upper limit of the ratio Wb2/TW is not particularly limited, but is subject to restrictions by other conditions such as the groove width and number of the circumferential grooves 23s, 23c, the arrangement positions of the shoulder circumferential grooves 23s, and the like.

The ground contact widths Wb1, Wb2 of the land portions are each measured as a linear distance in the tire axial direction at a contact surface between the land portion and a flat plate when the tire is mounted on a specified rim, inflated to a specified internal pressure, placed perpendicular to the flat plate in a static state, and loaded with a load corresponding to a specified load.

As illustrated in FIG. 2, each of the pair of shoulder land portions 31 includes a plurality of shoulder blocks 311 defined by the main lug grooves 21 and the sub lug grooves 22. Additionally, each of the pair of shoulder land portions 31 includes a single row of blocks formed from the shoulder blocks 311.

Additionally, in FIG. 3, a maximum ground contact length Lb1 (not illustrated) of the shoulder block 311 in the tire circumferential direction is in a range of $0.22 \leq Lb1/P1$ and preferably in a range of $0.32 \leq Lb1/P1$, with respect to the pitch length P1 of the main lug grooves. Consequently, the rigidity of the shoulder blocks 311 in the tire circumferential direction is ensured and the cut resistance performance and wear resistance performance of the tire are ensured. The upper limit of the ratio Lb1/P1 is not particularly limited, but is subject to restrictions due to the relationship between the maximum groove width Wg1 of the main lug groove 21 and the maximum groove width Wg2 of the sub lug groove 22.

Additionally, as illustrated in FIG. 2, the shoulder land portion 31 includes the circumferential-direction shallow groove 312 extending in the tire circumferential direction. The circumferential-direction shallow groove 312 is defined as a circumferential-direction groove having a maximum groove depth H12 (see FIG. 5) of less than 70% of the maximum groove depth Hg1 of the main lug groove 21. Further, the maximum groove depth H12 of the circumferential-direction shallow groove 312 has a relationship $0.50 \leq H12/Hg1 \leq 0.65$ with respect to the maximum groove depth Hg1 of the shoulder main groove 21. Additionally, the maximum groove width W12 of the circumferential-direction shallow groove 312 has a relationship $0.50 \leq W12/Wg3 \leq 0.90$, and preferably a relationship $0.60 \leq W12/Wg3 \leq 0.70$, with respect to the maximum groove width Wg3 of the shoulder circumferential groove 23s.

Additionally, in the configuration in FIG. 2, the circumferential-direction shallow groove 312 has a straight shape and extends across a plurality of main lug grooves 21 in the tire circumferential direction. Additionally, as illustrated in FIG. 3, the circumferential-direction shallow groove 312 divides the road contact surface of the shoulder block 311 in the tire width direction. Additionally, the circumferential-direction shallow groove 312 is disposed in the central portion of the shoulder land portion 31, specifically in a range of 30% or more and 70% or less of the maximum ground contact width Wb1 of the shoulder land portion 31 from the measurement points for the maximum ground contact width Wb1.

As illustrated in FIG. 3, the shoulder land portion 31 includes shoulder sipes 313 that penetrate the shoulder blocks 311 in the tire width direction. "Shoulder sipe 313" refers to a cut formed in a tread contact surface and has a maximum sipe width of less than 1.5 mm (not illustrated) and a maximum sipe depth H13 of 2.0 mm or more (see FIG. 5) such that the shoulder sipe closes when the tire comes into contact with the ground. Additionally, the maximum sipe depth H13 of the shoulder sipes 313 has a relationship $0.50 \leq H13/Hg3 \leq 0.85$ with respect to the maximum groove depth Hg3 of the shoulder circumferential groove 23s.

The sipe width is measured as the opening width of the sipe in the tread contact surface, when the tire is mounted on a specified rim, inflated to a specified internal pressure, and in an unloaded state.

The sipe depth is measured as the distance from the tread contact surface to the sipe bottom, when the tire is mounted on a specified rim, inflated to a specified internal pressure, and in an unloaded state. Additionally, in a configuration in which the sipe includes, at the sipe bottom, a partial raised bottom portion or recess/protrusion portion, the sipe depth is measured excluding this portion.

Note that in the configuration of FIG. 3, one shoulder block 311 includes a single shoulder sipe 313. Such a configuration is preferable in that the configuration properly ensures the rigidity of the shoulder block 311. However, no such limitation is intended, and a single shoulder block 311 may include a plurality of shoulder sipes 313 (not illustrated).

In the configuration in FIG. 2, each of the three rows of center land portions 32 includes a plurality of center blocks 321 defined by the main lug grooves 21 and the sub lug grooves 22. Each of the three center land portions 32 includes a single block row formed from these center blocks 321.

In FIG. 3, the maximum ground contact length Lb2 (not illustrated) of the center blocks 321 in the tire circumferential direction is in a range $0.22 \leq Lb2/P1$, and preferably in a range of $0.32 \leq Lb2/P1$, with respect to the pitch length P1 of the main lug grooves. Consequently, the rigidity of the center block 321 in the tire circumferential direction is ensured and the cut resistance performance and wear resistance performance of the tire are ensured. The upper limit of the ratio Lb2/P1 is not particularly limited, but is subject to restrictions due to the relationship between the maximum groove width Wg1 of the main lug groove 21 and the maximum groove width Wg2 of the sub lug groove 22.

Additionally, as illustrated in FIG. 3, the center land portion 32 includes a center sipe 322 that penetrates the center blocks 321 in the tire width direction. "Center sipe 322" refers to a cut formed in the tread contact surface and has a maximum sipe width of less than 1.5 mm (not illustrated) and a maximum sipe depth H22 of 2.0 mm or more (see FIG. 5) such that the sipe closes when the tire comes into contact with the ground. A maximum sipe depth H22 of the center sipe 322 has a relationship $0.90 \leq H22/Hg3 \leq 1.00$ with respect to the maximum groove depth Hg3 of the shoulder circumferential groove 23s. Additionally, the maximum sipe depth H13 of the shoulder sipe 313 in the shoulder land portion 31 has a relationship $0.50 \leq H13/H22 \leq 1.00$, and preferably a relationship $0.70 \leq H13/H22 \leq 0.85$, with respect to the maximum sipe depth H22 of the center sipe 322. The snow traction performance of the tire is improved due to the center sipe 322 having a relatively large sipe depth H22. On the other hand, the rigidity of the shoulder blocks 321 is ensured, and the cut resistance performance and wear resistance performance of the tire are ensured due to the shoulder sipe 313 having a relatively small sipe depth H13.

Note that in the configuration in FIG. 3, one center block 321 includes a single center sipe 322. Such a configuration is preferable in that the configuration properly ensures the rigidity of the center blocks 321. However, no such limitation is intended, and a single center block 321 may include a plurality of center sipes 322 (not illustrated).

Figure 6:
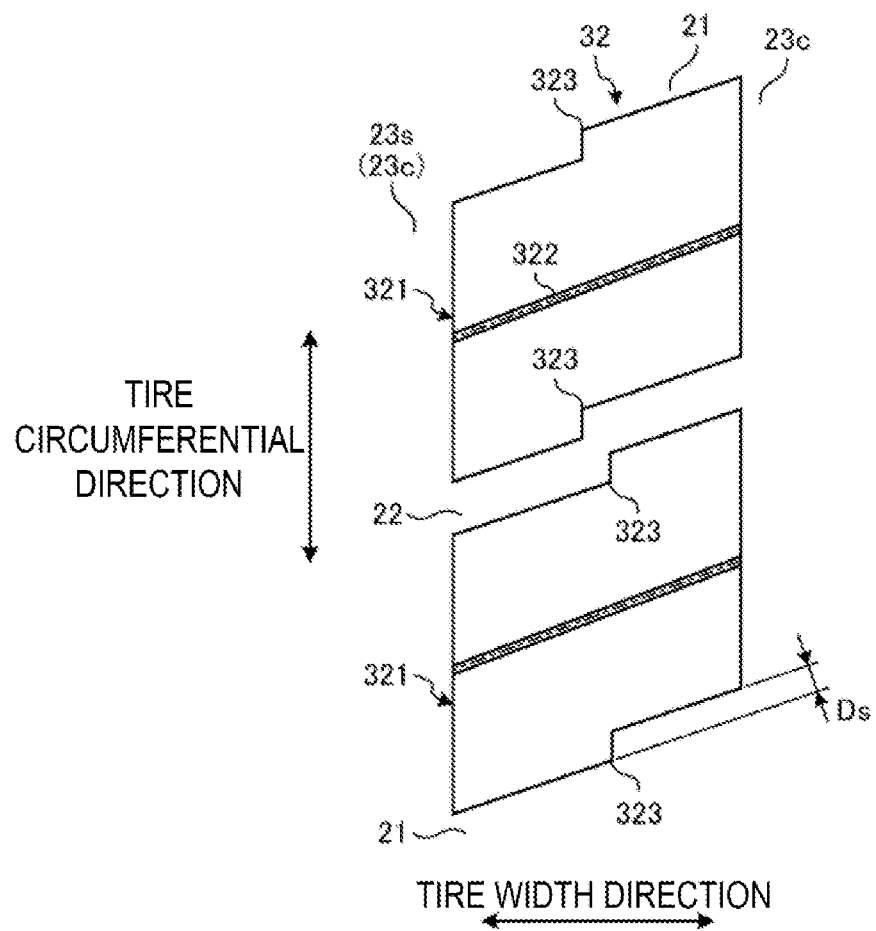
FIG. 6 is an enlarged view illustrating center blocks illustrated in FIG. 2.

FIG. 6 is an enlarged view illustrating the center blocks 321 illustrated in FIG. 2.

In the configuration in FIG. 2, as illustrated in FIG. 6, the center block 321 includes a step portion 323 on each of an edge portion on the main lug groove 21 side and an edge portion on the sub lug groove 22 side. Additionally, a level difference Ds of the step portion 323 has a relationship $0.10 \leq Ds/Hg1 \leq 0.20$ with respect to the maximum groove width Hg1 of the main lug groove 21 (see FIG. 3). In such a configuration, the step portion 323 increases the number of edge components of the center block 321, improving the snow traction performance of the tire. Note that in the configuration in FIG. 6, one edge portion of the center block 321 includes a single step portion 323. Such a configuration is preferable in that the configuration suppresses uneven wear of the edge portion of the block. However, no such limitation is intended, and a single edge portion may include a plurality of step portions (not illustrated). This further improves the snow traction characteristics of the tire.

Modified Examples

Figure 7:
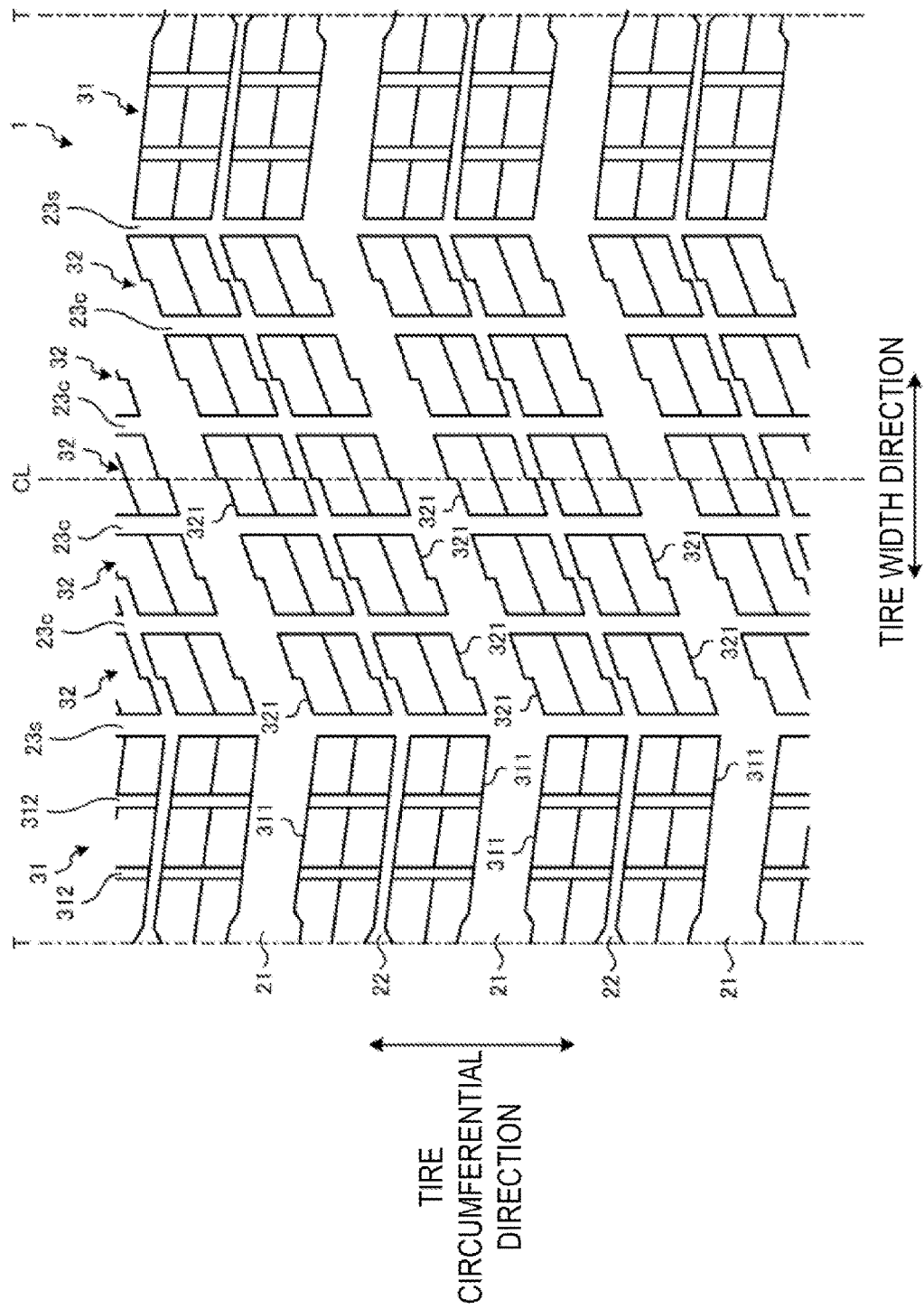
FIG. 7 is an explanatory diagram illustrating a modified example of the tire illustrated in FIG. 2.

FIG. 7 is an explanatory diagram illustrating a modified example of the tire 1 illustrated in FIG. 2. In the same drawing, constituents that are the same as the constituents illustrated in FIG. 2 are denoted by the same reference signs, and explanations thereof are omitted.

In the configuration in FIG. 2, as described above, the tire 1 includes a pair of shoulder circumferential grooves 23s, 23s, two center circumferential grooves 23c, and a pair of shoulder land portions 31, 31 and three rows of center land portions 32 defined by the circumferential grooves 23s, 23c. Additionally, each of the pair of shoulder land portions 31, 31 includes a single circumferential-direction shallow groove 312.

In contrast, in the configuration in FIG. 7, the tire 1 includes a pair of shoulder circumferential grooves 23s, 23s, and four center circumferential grooves 23c, and a pair of shoulder land portions 31, 31 and five rows of center land portions 32 defined by the circumferential grooves 23s, 23c. Additionally, each of the pair of shoulder land portions 31, 31 includes two circumferential-direction shallow grooves 312, 312. In this manner, in a case where the tire 1 has a large tire ground contact width, the number of components can be appropriately changed within the scope apparent to those skilled in the art.

Effect

As described above, the tire 1 includes the plurality of main lug grooves 21 and the plurality of sub lug grooves 22 extending in the tire width direction, penetrating the tread surface, and arranged at predetermined intervals in the tire circumferential direction (see FIG. 2). Additionally, each of the main lug grooves 21 is defined as a lug groove having a maximum groove width Wg1 (see FIG. 3) of 15.0 mm or more and a maximum groove depth Hg1 of 23.5 mm or more (see FIG. 4). In addition, the sub lug groove 22 is defined as a lug groove having a maximum groove width Wg2 (see FIG. 4) that satisfies the condition $0.10 \leq Wg2/Wg1 \leq 0.35$ with respect to the maximum groove width Wg1 of the main lug groove 21. Additionally, at least one of the sub lug grooves 22 is disposed between adjacent ones of the main lug grooves 21, 21 (see FIG. 2).

a. In such a configuration, (1) since the tire 1 includes the main lug grooves 21, which are wide, there is an advantage in that the snow discharge properties exhibited when traveling on a snowy road surface are improved and thus the snow traction properties are improved compared with a configuration in which only the narrow lug grooves are arranged in the tire circumferential direction. Additionally, (2) since the narrow sub lug grooves 22, which are narrow, are each disposed between the adjacent main lug grooves 21, 21, there is an advantage in that the number of edge components of the land portion is increased and the traction characteristics of the tire are improved compared with a configuration in which only with the main lug grooves (not illustrated) are provided, and, further, there is an advantage in that the rigidity of the land portion can be increased by increasing the arrangement interval of the main lug grooves 21. In addition, there is an advantage in that (3) the maximum groove width Wg2 of the sub lug grooves 22 is appropriately set with respect to the maximum groove width Wg1 of the main lug groove 21. Specifically, the lower limit of the above-described ratio WG2/Wg1 ensures the snow discharge properties of the sub lug grooves 22, and the upper limit of the above-described ratio Wg2/Wg1 suppresses a decrease in the rigidity of the land portions caused by an excessively large groove width of the sub lug groove 22.

b. Additionally, in the tire 1, the maximum groove width Wg1 of the main lug groove 21 has a relationship 0.15≤Wg1/P1≤0.40 with respect to the pitch length P1 of the main lug grooves 21 (see FIG. 3). This has an advantage in that the maximum groove width Wg1 of the main lug groove 21 is appropriately set. In other words, the lower limit described above ensures the groove width of the main lug groove 21 and ensures the snow discharge properties of the main lug groove 21. The upper limit described above suppresses a decrease in the rigidity of the land portions caused by an excessively large groove width of the main lug groove 21.

c. Additionally, in the tire 1, the maximum groove depth Hg2 of the sub lug groove 22 has a relationship 0.80≤Hg2/Hg1≤1.00 with respect to the maximum groove depth Hg1 of the main lug groove 21. Consequently, there is an advantage in that the maximum groove depth Hg2 of the sub lug groove 22 is appropriately set. In other words, the lower limit described above ensures the groove depth of the sub lug groove 22 and ensures the traction action of the sub lug groove 22. The upper limit described above suppresses a decrease in the rigidity of the land portions caused by an excessively large groove depth of the sub lug groove 22.

Additionally, the tire 1 includes three or more circumferential grooves 23s, 23c extending in the tire circumferential direction, and four or more rows of land portions 31, 32 defined by the main grooves 21, the sub lug grooves 22, and the circumferential grooves 23s, 23c (see FIG. 2). Additionally, the circumferential grooves 23s, 23c are defined as circumferential grooves having maximum groove widths Wg3, Wg3' of 12.5 mm or more (see FIG. 3), and a maximum groove depth Hg3 that is 70% or more of the maximum groove depth Hg1 of the main lug groove 21 (see FIG. 5). In such a configuration, since the circumferential grooves 23s, 23c extend in the tire circumferential direction and intersect with the main lug grooves 21 and the sub lug grooves 22. there is an advantage in that snow discharge from the main lug grooves 21 and the sub lug grooves 22 is promoted.

Additionally, in the tire 1, the pair of shoulder circumferential grooves 23s, 23s on the outermost side of the three or more circumferential grooves 23s, 23c in the tire width direction is defined, and the center circumferential groove 23c located between the pair of shoulder circumferential grooves 23s, 23s is defined (see FIG. 2), and the maximum groove width Wg3 of the pair of shoulder circumferential grooves 23s, 23s has a relationship 0.25≤Wg3/Wg1≤0.55 with respect to the maximum groove width Wg1 of the main lug groove 21 (see FIG. 3). Consequently, there is an advantage in that the groove width of the shoulder circumferential groove 23s is appropriately set. In other words, the upper limit described above ensures the groove width of the shoulder circumferential groove 23s and ensures the snow discharge properties of the main lug grooves 21 and the sub lug grooves 22 that intersect with the shoulder circumferential groove 23s. The upper limit described above suppresses a decrease in the rigidity of the land portions caused by an excessively large groove width of the shoulder circumferential groove 23s.

Additionally, in the tire 1, the maximum groove depth Hg3 of the pair of shoulder circumferential grooves 23s has a relationship 0.70≤Hg3/Hg1≤0.90 with respect to the maximum groove depth Hg1 of the main lug groove 21 (see FIG. 5). Consequently, there is an advantage in that the groove depth of the shoulder circumferential groove 23s is appropriately set. Specifically, the lower limit described above ensures the groove depth of the shoulder circumferential groove 23s and ensures the snow discharge properties of the main lug grooves 21 and the sub lug grooves 22 that intersect with the shoulder circumferential groove 23s. The upper limit described above suppresses a decrease in the rigidity of the land portion caused by an excessively large groove depth of the shoulder circumferential groove 23s.

Additionally, in the tire 1, the maximum groove width Wg3' of the center circumferential groove 23c has a relationship 0.80≤Wg3'/Wg3≤1.00 with respect to the maximum groove width Wg3 of the shoulder circumferential groove 23s (see FIG. 3). Consequently, there is an advantage in that the groove width of the center lug groove 23c is appropriately set. In other words, the lower limit described above ensures the groove width of the center lug groove 23c and ensures the snow discharge properties of the tread portion center region. The upper limit described above suppresses a decrease in the rigidity of the center land portion 32 caused by an excessively large groove width of the center circumferential groove 23c.

Additionally, in the tire 1, the maximum groove depth Hg3' of the center circumferential groove 23c has a relationship 0.85≤Hg3'/Hg3≤1.00 with respect to the maximum groove depth Hg3 of the pair of shoulder circumferential grooves 23s. Consequently, there is an advantage in that the groove depth of the center circumferential groove 23c is appropriately set. In other words, the lower limit described above ensures the groove depth of the center circumferential groove 23c to ensure the snow discharge properties of the tread portion center region. The upper limit described above suppresses a decrease in the rigidity of the center land portion 32 caused by an excessively large groove depth of the center circumferential groove 23c.

Additionally, in the tire 1, the distance Dg3 from the tire equatorial plane CL to the groove center line of each of the pair of shoulder circumferential grooves 23s, 23s has a relationship 0.20≤Dg3/TW≤0.35 with respect to the tire ground contact width TW (see FIG. 2). Consequently, there is an advantage in that the positions of the pair of shoulder circumferential grooves 23s, 23s are appropriately set within the tire ground contact surface.

Additionally, in the tire 1, the main lug groove 21 has a bent shape and includes bend points at the respective intersection positions where the main lug groove 21 intersects the pair of shoulder circumferential grooves 23s, 23s (see FIG. 2). Consequently, there is an advantage in that the snow discharge properties of the main lug groove 21 are improved.

Additionally, in the tire 1, the shoulder region and center region of the tread portion demarcated by the pair of shoulder circumferential grooves 23s, 23s are defined (see FIG. 2). Additionally, the inclination angle θs of the groove center line of the main lug groove 21 with respect to the tire circumferential direction in the shoulder region is in a range of 80 degrees≤θs≤100 degrees (see FIG. 3). In addition, the inclination angle θc of the groove center line of the main lug groove 21 with respect to the tire circumferential direction in the center region is in a range of 60 degrees≤θc≤75 degrees. Consequently, there is an advantage in that the inclination angles θs, θc of the lug grooves 21 are appropriately set. In other words, the lower limit and upper limit of the inclination angle θs in the shoulder region ensure the traction characteristics and snow discharge properties of the main lug grooves 21. In addition, the lower limit of the inclination angle θc in the center region ensures the rigidity of the center blocks 321. Additionally, the upper limit of the inclination angle θc in the center region ensures the snow discharge properties of the main lug grooves 21.

Additionally, in the tire 1, among the four or more rows of land portions 31, 32, the pair of shoulder land portions 31, 31 defined by the tire ground contact edge T and the shoulder circumferential groove 23s are defined (see FIG. 2). Additionally, the shoulder land portion 31 includes the circumferential-direction shallow groove 312 extending in the tire circumferential direction. Additionally, the circumferential-direction shallow groove 312 is defined as a circumferential groove having a maximum groove depth H12 of less than 70% of the maximum groove depth Hg1 of the main lug grooves 21 (see FIG. 5). In such a configuration, since the shoulder land portion 31 includes the circumferential-direction shallow grooves 312, there is an advantage in that the snow discharge properties of the tread portion shoulder region are improved.

Additionally, in the tire 1, the maximum groove width W12 of the circumferential-direction shallow groove 312 has a relationship 0.50≤W12/Wg3≤0.90 with respect to the maximum groove width Wg3 of the shoulder circumferential groove 23s (see FIG. 3). Consequently, there is an advantage in that the groove width of the circumferential-direction shallow groove 312 is appropriately set. In other words, the lower limit described above ensures the groove width of the circumferential-direction shallow groove 312 and ensures the snow discharge properties of the tread portion shoulder region. Additionally, the upper limit described above suppresses a decrease in the rigidity and ground contact area of the shoulder land portion 31 caused by an excessively large groove width of the circumferential-direction shallow groove 312.

Additionally, in the tire 1, among the four or more rows of land portions 31, 32, the center land portion 32 defined by the shoulder circumferential groove 23s and the center circumferential groove 23c or the pair of adjacent center circumferential grooves 23c, 23c are defined (see FIG. 2). Additionally, the center land portion 32 includes the plurality of center blocks 321 defined by the main lug grooves 21 and the sub lug grooves 22. In addition, the center block 321 includes the step portion 323 on the edge portion on the main lug groove 21 side (see FIG. 6). Consequently, there is an advantage in that the tire traction characteristics are improved.

Target of Application

In addition, in this embodiment, a heavy duty tire, particularly a pneumatic tire for a construction vehicle, has been described as an example of the tire. However, no such limitation is intended, and the configuration described in this embodiment can be applied to other tires within the scope of obviousness to those skilled in the art. Examples of other tires include airless tires, solid tires, and the like.

Example

FIGS. 8-11 are tables showing the results of performance tests of the tire according to embodiments of the present technology.

In the performance tests, a plurality of types of test tires were evaluated in terms of (1) snow traction performance and (2) uneven wear resistance performance. Test tires having a tire size of 1400R24 are assembled on rims specified by JATMA, and an internal pressure specified by JATMA and a load specified by JATMA are applied to the test tires. Furthermore, the test tires were mounted on all the wheels of a snow removing motor grader serving as a test vehicle.

For evaluation of snow traction performance, the test vehicle is driven on a snowy road surface of a snowy road test site and the acceleration time until the travel speed reaches 20 km/h from 5 km/h is measured. The measurement results are expressed as index values and evaluated with the Conventional Example being assigned as the reference (100). In this evaluation, larger values are preferable.

In the evaluation of uneven wear resistance performance, after the test vehicle has been driven for 30000 km on a predetermined paved road, the degree of wear is observed and expressed as index values and evaluated. Results of the evaluation are expressed as index values and evaluated with the Conventional Example being assigned as the reference (100). In this evaluation, larger values are preferable. Moreover, if the value is 96 or higher, it is deemed that the performance is appropriately ensured.

Some of the grooves and sipes in the test tires of Examples 1 to 21 are omitted in the configuration of FIGS. 1 to 3. The test tires of Examples 22 and 23 have the configuration illustrated in FIGS. 1 to 3, and include a plurality of main lug grooves 21 and a plurality of sub lug grooves 22 extending in the tire width direction and penetrating the tread surface, four circumferential grooves 23s, 23c extending in the tire circumferential direction, and five rows of land portions 31, 32 defined by the main lug grooves 21, the sub lug grooves 22, and the circumferential grooves 23s, 23c. Additionally, the tire ground contact width TW is 315 mm. The maximum groove width Wg1 of the main lug grooves 21 is 40.0 mm, and the maximum groove depth Hg1 is 23.5 mm. Additionally, the shoulder circumferential groove 23s has a maximum groove width Wg3 of 10.0 mm and a maximum groove depth Hg3 of 22.0 mm.

The test tire of the Conventional Example corresponds to the test tire of Example 1 including a simple tread surface provided only with the main lug grooves 21 and in which the sub lug grooves 22, the circumferential grooves 23s, 23c, the circumferential-direction shallow grooves 312, and the sipes 313, 322 are omitted.

As can be seen from the test results, the test tires of the Examples provide both snow traction performance and uneven wear resistance performance in a compatible manner.

The invention claimed is:
1. A tire, comprising:
a plurality of main lug grooves that extend in a tire width direction and penetrate a tread surface, and that are arranged at predetermined intervals in a tire circumferential direction,
a plurality of sub lug grooves that extend in the tire width direction and penetrate the tread surface, and that are arranged at predetermined intervals in the tire circumferential direction,
three or more circumferential grooves extending in the tire circumferential direction, and
four or more rows of land portions defined by the main lug grooves, the sub lug grooves, and the circumferential grooves, each of the main lug grooves and each of the sub lug grooves penetrating the tread surface by extending continuously across an entirety of the tread surface in the tire width direction to tire ground contact edges on both sides of the tread surface in the tire width direction, the main lug grooves being defined as lug grooves having a maximum groove width Wg1 of 15.0 mm or more and a maximum groove depth Hg1 of 23.5 mm or more, the sub lug grooves being defined as lug grooves having a maximum groove width Wg2 that satisfies a condition of $0.10 \leq Wg2/Wg1 \leq 0.35$ with respect to the maximum groove width Wg1 of the main lug grooves, at least one of the sub lug grooves being disposed between adjacent ones of the main lug grooves, the circumferential grooves being defined as circumferential grooves having a maximum groove width of 12.5 mm or more and a maximum groove depth of 70% or more of the maximum groove depth Hg1 of the main lug grooves, among the three or more circumferential grooves, a pair of shoulder circumferential grooves on an outermost side in the tire width direction and a center circumferential groove located between the pair of shoulder circumferential grooves being defined, a maximum groove width Wg3 of the pair of shoulder circumferential grooves having a relationship $0.25 \leq Wg3/Wg1 \leq 0.55$ with respect to the maximum groove width Wg1 of the main lug grooves, and a distance Dg3 from a tire equatorial plane to a groove center line of each of the pair of shoulder circumferential grooves having a relationship $0.20 \leq Dg3/TW \leq 0.35$ with respect to a tire ground contact width TW.

2. The tire according to claim 1, wherein the maximum groove width Wg1 of the main lug grooves has a relationship $0.15 \leq Wg1/P1 \leq 0.40$ with respect to a pitch length P1 of the main lug grooves.

3. The tire according to claim 1, wherein a maximum groove depth Hg2 of the sub lug grooves has a relationship $0.80 \leq Hg2/Hg1 \leq 1.00$ with respect to the maximum groove depth Hg1 of the main lug grooves.

4. The tire according to claim 1, wherein a maximum groove depth Hg3 of the pair of shoulder circumferential grooves has a relationship $0.70 \leq Hg3/Hg1 \leq 0.90$ with respect to the maximum groove depth Hg1 of the main lug grooves.

5. The tire according to claim 1, wherein a maximum groove width Wg3' of the center circumferential groove has a relationship $0.80 \leq Wg3'/Wg3 \leq 1.00$ with respect to the maximum groove width Wg3 of the shoulder circumferential grooves.

6. The tire according to claim 5, wherein a maximum groove depth Hg3' of the center circumferential groove has a relationship $0.85 \leq Hg3'/Hg3 \leq 1.00$ with respect to a maximum groove depth Hg3 of the pair of shoulder circumferential grooves.

7. The tire according to claim 1, wherein the main lug grooves have a bent shape and have bent points at respective intersection positions where the main lug grooves intersect the pair of shoulder circumferential grooves.

8. The tire according to claim 7, wherein a shoulder region and a center region of a tread portion demarcated by the pair of shoulder circumferential grooves are defined, an inclination angle θs of a groove center line of the main lug grooves with respect to the tire circumferential direction in the shoulder region is in a range of 80 degrees $\leq \theta s \leq 100$ degrees, and an inclination angle θc of the groove center line of the main lug grooves with respect to the tire circumferential direction in the center region is in a range of 60 degrees $\leq \theta c \leq 75$ degrees.

9. The tire according to claim 1, wherein among the four rows of land portions, a pair of shoulder land portions defined by a tire ground contact edge and the shoulder circumferential grooves is defined, the shoulder land portion comprises a circumferential-direction shallow groove extending in the tire circumferential direction, and the circumferential-direction shallow groove is defined as a circumferential groove having a maximum groove depth of less than 70% of the maximum groove depth Hg1 of the main lug groove.

10. The tire according to claim 9, wherein a maximum groove width W12 of the circumferential-direction shallow groove has a relationship $0.50 \leq W12/Wg3 \leq 0.90$ with respect to the maximum groove width Wg3 of the shoulder circumferential grooves.

11. The tire according to claim 1, wherein among the four rows of land portions, a center land portion defined by the shoulder circumferential grooves and the center circumferential groove or a pair of adjacent ones of the center circumferential grooves is defined, the center land portion comprises a plurality of center blocks defined by the main lug grooves and the sub lug grooves, and the center block comprises a step portion on an edge portion on the main lug groove side.

12. A tire, comprising:

a plurality of main lug grooves that extend in a tire width direction and penetrate a tread surface, and that are arranged at predetermined intervals in a tire circumferential direction, a plurality of sub lug grooves that extend in the tire width direction and penetrate the tread surface, and that are arranged at predetermined intervals in the tire circumferential direction, three or more circumferential grooves extending in the tire circumferential direction, and four or more rows of land portions defined by the main lug grooves, the sub lug grooves, and the circumferential grooves, each of the main lug grooves and each of the sub lug grooves penetrating the tread surface by extending continuously across an entirety of the tread surface in the tire width direction to tire ground contact edges on both sides of the tread surface in the tire width direction, the main lug grooves being defined as lug grooves having a maximum groove width Wg1 of 15.0 mm or more and a maximum groove depth Hg1 of 23.5 mm or more, the sub lug grooves being defined as lug grooves having a maximum groove width Wg2 that satisfies a condition of $0.10 \leq Wg2/Wg1 \leq 0.35$ with respect to the maximum groove width Wg1 of the main lug grooves, at least one of the sub lug grooves being disposed between adjacent ones of the main lug grooves, the circumferential grooves being defined as circumferential grooves having a maximum groove width of 12.5 mm or more and a maximum groove depth of 70% or more of the maximum groove depth Hg1 of the main lug grooves, among the three or more circumferential grooves, a pair of shoulder circumferential grooves on an outermost side in the tire width direction and a center circumferential groove located between the pair of shoulder circumferential grooves being defined, a maximum groove width $Wg3$ of the pair of shoulder circumferential grooves having a relationship $0.25 \leq Wg3/Wg1 \leq 0.55$ with respect to the maximum groove width $Wg1$ of the main lug grooves, among the four rows of land portions, a pair of shoulder land portions defined by a tire ground contact edge and the shoulder circumferential grooves being defined, the shoulder land portion comprising a circumferential-direction shallow groove extending in the tire circumferential direction, the circumferential-direction shallow groove being defined as a circumferential groove having a maximum groove depth of less than 70% of the maximum groove depth $Hg1$ of the main lug groove, and a maximum groove width $W12$ of the circumferential-direction shallow groove having a relationship $0.50 \leq W12/Wg3 \leq 0.90$ with respect to the maximum groove width $Wg3$ of the shoulder circumferential grooves.

* * * * *